United States Patent [19]

Holmgren et al.

[11] Patent Number: 4,710,393

[45] Date of Patent: Dec. 1, 1987

[54] LOW WATER ACTIVITY CONFECTION COMPOSITION

[75] Inventors: Mark E. Holmgren; Gregory K. Parrish; Philip A. Cartier, all of Hummelstown, Pa.

[73] Assignee: Hershey Foods Corporation, Hershey, Pa.

[21] Appl. No.: 907,079

[22] Filed: Sep. 15, 1986

[51] Int. Cl.$^4$ .......................... A23G 3/32; A23G 3/00
[52] U.S. Cl. .................................. 426/660; 426/321; 426/331; 426/334
[58] Field of Search ............... 426/660, 321, 331, 334

[56] References Cited

U.S. PATENT DOCUMENTS

| | | | |
|---|---|---|---|
| 3,692,542 | 9/1972 | Walon | 426/660 |
| 4,605,561 | 8/1986 | Lang | 426/660 |
| 4,614,654 | 9/1986 | Ream et al. | 426/660 |
| 4,623,543 | 11/1986 | Motegi et al. | 426/660 |

Primary Examiner—Jeanette Hunter
Attorney, Agent, or Firm—Paul & Paul

[57] ABSTRACT

A water-base sugar confection having a caramel flavor and texture and formed of a total carbohydrate content equal to or greater than fifty percent by weight, dry basis wherein the carbohydrate ingredient consists essentially of a blend of dextrose and fructose in which the ratio of fructose to dextrose is from 30:70 to 90:10, the moisture content is an amount within the range of from about 4% to about 10% and the water activity (Aw) is an amount within the range of from about 0.20 Aw to about 0.50 Aw.

2 Claims, No Drawings

LOW WATER ACTIVITY CONFECTION COMPOSITION

This invention relates to sugar confectionary, and more particularly it relates to such confectionary items having reduced water activity which have good flavor and texture. A specific example of such a confection is caramel candy.

DESCRIPTION OF THE PRIOR ART

It is desirable to extend the shelf life of processed food, while retaining the original flavor and texture thereof. One method that has been devised for accomplishing this purpose is by reducing the water activity (Aw) of the food. The Aw of a food is the partial vapor pressure of the food, and is related both to the total moisture level in the food and the extent to which the water is available to support growth of microorganisms and to participate in chemical reactions. While it has been suggested that a high sugar content of food leads to reduced water activity, the addition of polyhydric alcohols to formulations already containing sugar has been taught as improving the texture of the finished product. However, it is also known that certain polyhydric alcohols are disadvantageous in food formulations for various reasons. Among these disadvantages are the possibility of laxative effects at high consumption levels. Polyhydric alcohols are also known to contribute undesirable tastes at increased concentrations in the food product. Polyols, such as glycerine and propylene glycol, while also known as texture improvers, are known to contribute undesirable tastes at higher levels.

The most effective way of reducing the water activity of a food is the reduction of the water content. However, the reduction of water content in a confection causes the product to become harder, stiffer and less palatable.

It is therefore an object of this invention to provide a water-base confection having low water activity, good flavor and good texture.

It is another object of this invention to provide a waterbase confection having low water activity without the use of additives which are known to contribute undesirable flavors or to cause unwanted physiological side effects.

SUMMARY OF THE INVENTION

We have now discovered a confectionary formulation for caramel candy and the like having good flavor and soft texture in which (a) the total carbohydrate content is equal to or greater than fifty percent of the product weight when calculated on a dry basis; (b) the carbohydrate consists essentially of a blend of dextrose and fructose in which the ratio of fructose to dextrose is from 30:70 to 90:10; (c) the moisture content is an amount in the range of from about 4% to about 10%; and (d) the water activity (Aw) is an amount within the range from about 0.20 Aw to about 0.50 Aw. It has been found that when the non-carbohydrate ingredients total more than fifty percent of the confection, negative effects occur. Fats and oils become difficult to emulsify and to keep emulsified. Emulsifiers become costly and can have a negative impact on flavor. High levels of protein have a negative effect on the texture of the product. High levels of salt have a detrimental effect on flavor.

The range of fructose to dextrose ratios is critical since when the dextrose level is increased above 78% of the total carbohydrates, there is an increased tendency for the dextrose to crystallize, and when the fructose level is increased above 90% of the total carbohydrates, there is an increased tendency for the fructose to crystallize. The crystallization of either dextrose or fructose results in changes in the texture of the product and an increase in water activity. The blend of dextrose and fructose may be obtained in several ways, included among which is the actual blending of commercial crystalline dextrose and fructose or solutions thereof. Alternatively, dextrose/fructose blends may be obtained in certain relative proportions by selecting a grade of high fructose corn syrup, e.g. 42, 55, 90 high fructose corn syrup. Likewise, a blend of dextrose and fructose may be provided by an invert sugar solution.

Moisture contents of the confection below about 4% will result in a hard texture, while moisture contents above about 10% will likely result in water activities above 0.50 Aw.

While the dextrose/fructose blend is the essential carbohydrate ingredient necessary to yield the low water activity confections of this invention, up to about 49% of the dextrose/fructose blend may be replaced by other carbohydrates with molecular weights less than about 360, such as sucrose, lactose and maltose. However, sucrose is less effective in reducing water activity than the dextrose/fructose blend. Sucrose has an increased tendency to crystallize at higher use levels. Lactose has a strong tendency to crystallize since it is not highly soluble in water when compared to other saccharides. Lactose is not readily available to the food industry in large quantities. Lactose is likely to be more costly than the dextrose/fructose blend. Maltose is not readily available to the food industry in a concentrated form. Maltose is more costly than the dextrose/fructose blend.

DESCRIPTION OF THE PREFERRED EMBODIMENT

Example 1

A caramel confection was produced as follows:

The amounts as indicated on a percent-by-weight basis of the following ingredients were assembled:

| Ingredient | % by weight |
| --- | --- |
| Water | 11.4 |
| Non-fat dry milk powder | 5.7 |
| High fructose corn syrup - 55% Conversion | 74.5 |
| Molasses | 0.4 |
| Salt | 0.4 |
| Glycerol Monostearate | 0.4 |
| Lecithin | 0.1 |
| Refined Palm Kernel Oil | 7.1 |

Hydrated non-fat milk was prepared by blending the non-fat dry milk powder into the water in a vessel equipped with a high shear mixer. A "fat blend" was prepared in a separate vessel by combining the refined palm kernel oil, glycerol monostearate and lecithin and heating the mixture to 140°–150° F. with agitation to achieve a uniform molten blend. A "water phase" was prepared by combining the high fructose corn syrup, hydrated non-fat milk, molasses and salt in a vessel which was heated to approximately 150° F. while agitating. The molten "fat blend" was added to the 130° F.

"water phase" and stirred until uniformly blended. This blend was cooked at 254° F. in a kettle equipped with swept-surface agitating means yielding a caramel product having a water content of 9.9%. Two samples of this product were tested for water activity (Aw): found—0.398–0.402. By varying the final cooking temperature (254° F.), a product cooked to lower temperatures will have a lower solids content and be softer and more fluid in texture, while a product cooked to higher temperatures will result in a higher solids content and a firmer texture. The confection produced in accordance with Example 1 had a caramel flavor and a desirable chewy texture. These characteristics are believed to be unexpected in the case of a product having such low total moisture and low water activity (Aw). The advantages of such a product are many. One advantage is that such a product is more compatible with dry crisp items such as crisp rice, wafers, puffed cereal items, cookies, crackers and the like. Conventional water-based confections lose moisture to such drier items and when moisture equilibrium is attained, the confection has hardened and toughened and the drier items have lost some of their crisp texture. The confectionary composition of this invention starts at a water activity level closer or equal to that of many dry crisp items. Therefore, little or no moisture migrates between the two components, and little or no changes take place in the texture of either of the components. Also, the rate at which moisture migration and texture deterioration take place is very slow when compared with earlier combinations of ingredients having both a chewy texture confection and a crisp component. There is also significantly less tendency for the confection to dry out upon storage, which leads to longer shelf life. Moreover, the low water activity confection of this invention is marked by characteristic reduced reaction rates for such deleterious food reactions as non-enzymatic browning, which lead to offcolors and flavors; lipid oxidation, which causes rancidity in fat containing ingredients such as peanuts and nutmeats; water-soluble nutrient degradation and most enzymatic reactions.

While we have described a specific low water activity confection, the advantages and benefits flowing from such composition are equally applicable to such confectionary systems as marshmallows, nougats, some fondants, fudges, gums, jellies and other water-based confections dependent upon a characteristic flavor and relatively soft texture.

Having thus described our invention, we claim:

1. A water-based sugar confection having good flavor and soft texture comprising (a) a total carbohydrate content equal to or greater than fifty percent by weight, dry basis; wherein said carbohydrate ingredient consists essentially of a blend of dextrose and fructose in which the ratio of fructose to dextrose is from 30:70 to 90:10; (b) the moisture content is an amount within the range of from about 4% to about 10%; and (c) the water activity (Aw) is an amount within the range of from about 0.20 Aw to about 0.50 Aw.

2. A confection in accordance with claim 1 characterized further by a caramel flavor.

* * * * *